United States Patent [19]

Alfter et al.

[11] 4,131,702
[45] Dec. 26, 1978

[54] SELF-SUPPORTING MOLDED COMPONENT FOR AUTOMOTIVE VEHICLES

[75] Inventors: Franz W. Alfter, Siegburg; Hans-Ulrich Breitscheidel, Troisdorf; Günter Mecklenburg, Troisdorf-Spich; Paul Spielau, Troisdorf, all of Germany

[73] Assignee: Dynamit Nobel Aktiengesellschaft, Germany

[21] Appl. No.: 807,335

[22] Filed: Jun. 16, 1977

[30] Foreign Application Priority Data

Jun. 16, 1976 [DE] Fed. Rep. of Germany ... 7619090[U]

[51] Int. Cl.$^2$ .......................... B32B 1/04; B32B 3/26; B32B 3/28; B62D 25/06
[52] U.S. Cl. ................................ 428/76; 296/137 A; 428/213; 428/314
[58] Field of Search .................. 296/137 A, 137R; 428/68, 74, 76, 157, 158, 159, 182, 310, 311, 315, 317, 318, 314, 213; 273/137 A

[56] References Cited

U.S. PATENT DOCUMENTS

| 3,432,372 | 3/1969 | Avot | 428/182 |
| 4,020,207 | 4/1977 | Alfter et al. | 296/137 A |

FOREIGN PATENT DOCUMENTS

| 1362035 | 4/1964 | France | 428/315 |

Primary Examiner—William J. Van Balen
Attorney, Agent, or Firm—Craig & Antonelli

[57] ABSTRACT

A self-supporting molded headliner for use in the inside of automobile roofs is formed of a layered composite arrangement or construction of polyethylene foam panels laminated or otherwise secured on both sides to at least one reinforcing layer of rigid paperboard, for example, corrugated cardboard or carton material.

6 Claims, 5 Drawing Figures

SELF-SUPPORTING MOLDED COMPONENT FOR AUTOMOTIVE VEHICLES

The present invention relates to a self-supporting molded component for lining the inside of automobile roofs, made of crosslinked polyethylene foam sheets with reinforcing inserts of the type described, for example, in DOS 2,259,862.

At the present time, there is a strong tendency in the automobile industry to replace the hoop-frame dome with a synthetic leather sheet, heretofore customary for the interior lining, by other systems, especially self-supporting prefabricated domes or headliners. Several types of vehicles are presently on the market wherein domes of this type have been mounted. The following systems are known:

1. The actual support for the dome consists of a resin-impregnated mat material which is laminated by heat or glue, for example, either before or after the molding step, with a synthetic leather sheet or with textile materials. The edges of the dome are sealed by folding the sheet over, in order to avoid moisture absorption. Such domes have been installed at the present time in the Volvo 442, RO 80, Simca 1308, Fiat 126, Saab, and several Japanese passenger cars. These domes are relatively expensive and complicated.

2. An alternative solution as compared to the solution discussed in point (1) consists of a supporting member of molded polystyrene foam with reinforcing inserts, for example steel. This molded member is covered toward the visible side with a thin layer of polyurethane-soft foam and with a synthetic leather sheet or a fabric. This solution has the grave disadvantage that a long-term storage process is necessary to control the shrinking procedure and to thereby obtain dimensionally accurate molded members.

A further problem resides in the adhesion of polystyrene foam and soft polyurethane foam. The decorative layer is very readily detached after a longer period of use, especially at the greatly deformed locations, at higher temperatures (110° C.). Also, the polystyrene foam dome is relatively brittle, requiring special preparatory measures during the installation thereof into the vehicle.

3. It is furthermore known to manufacture self-supporting domes of crosslinked polyethylene foam with reinforcing inserts of primarily thermoplastic synthetic resins; as disclosed in DOS 2,259,862 and DOS 2,321,282. In the last-mentioned DOS, a dome is described having reinforcing inserts of profiled steel sheets. Domes having such a structure have proven themselves well, but they are very expensive due to the inserted reinforcements and thus do not find widespread commercial usage.

The present invention is based on the aforementioned factors and has the objective of developing a self-supporting molded component which does not exhibit the above-mentioned disadvantages.

This objective has been attained, in accordance with the invention, by providing a self-supporting molded component for lining the inside of automobile roofs, i.e. a headliner having a layered construction of polyethylene foam panels, preferably crosslinked polyethylene foam panels, applied to both sides of at least one reinforcing layer of paperboard, e.g. corrugated cardboard or carton material. The molded component according to the invention consists, with respect to its basic elements, of preferably crosslinked polyethylene foam panels and reinforcing inserts of corrugated cardboard sheets or carton sheets. The sheets can be bonded to one another prior to the molding step by means of heat, as well as during the molding step. In this connection, it is important that no additional adhesive is required for connecting the crosslinked polyethylene foam panels with the corrugated cardboard or carton sheets. A heat treatment alone results in a permanent bond. If, in a special case, it should become necessary, also an additional adhesive, such as from polyurethane can be used. Preference is given to a crosslinked foam of high pressure polyethylene having a density of 25–70 kg/m$^3$ and a layer thickness of 2–12 mm. The economical advantage of the molded component of this invention for use as a car dome resides in the use of the inexpensive corrugated cardboard or carton material. In this connection, it has been found suprisingly that the bonded composite of corrugated cardboard and polyethylene foam panels can be molded very readily, for example in presses, which was not to be expected due to the rigidity of corrugated cardboard and/or carton material.

Projecting nubs, ribs, wedges, or the like of the polyethylene foam material can be molded to the molded component of this invention, for example on the side facing the automobile roof, preferably in the marginal zones. By means of these integrally molded nubs or ribs, the dome can be easily installed in the automobile, for example by locking or clamping into corresponding elements of the automobile roof.

Since corrugated paper or carton is very sensitive to moisture and loses considerably in rigidity after moisture adsorption, it is necessary when using corrugated paper or carton as reinforcing layers in vehicle headliners to protect such material from moisture penetration. Therefore, it is suggested in a further development of the invention to have the reinforcing layer surrounded on all sides by the polyethylene foam panels and to seal the layer especially against moisture penetration. By the use of polyethylene foam material, especially crosslinked polyethylene foam, which is water-impermeable due to its closed-cell structure, these requirements are extensively satisfied. The complete enclosing of the reinforcing layer of corrugated paper or carton material can be achieved, for example, by providing that the rims of the polyethylene foam panels project along all sides past the reinforcing layer. In this connection, the polyethylene foam panels, bonded together on the outside, can form a continuous edge strip which is absolutely waterproof. This makes it possible to dispense with the use of moisture-proof corrugated paper or carton materials, which would also be feasible.

In adaptation to the vehicle roof, it is furthermore possible to provide the molded component of this invention on the side facing the vehicle roof with indentations formed integrally with the component in order to line roof crossbeams or the like.

To improve the optical effect as well as its usage, the molded component of this invention can be embossed and/or additionally provided with decorative materials, such as textile materials, synthetic resin sheets, or similar materials, laminated thereto, on the surface facing the interior of the automobile.

The molded component of this invention can be manufactured according to various processes. One possibility resides in producing the composite element of polyethylene foam panels and the reinforcing layer of corrugated paper prior to the molding step by means of flame laminating. Depending on the requirements, the foam panel constituting the visible face can be bonded to a decorative material, e.g. a textile material or a synthetic leather, likewise by means of flame laminating. The total composite is then heated to about 160°-180° C. and molded in a molding device consisting of a male and female mold under the effect of pressure. In this connection, it is furthermore possible to provide the visible face of the dome with embossing while in the molding device, to obtain a surface which is correspondingly more effective from an optical viewpoint.

A further possibility for producing the molded component resides in placing the individual sheets of polyethylene foam and corrugated cardboard loosely on top of one another and to heat the entire parcel likewise to 160°-180° C., for example in a furnace with air circulation, and then to mold the parcel in a molding device consisting of a male mold and a female mold with the use of pressure. The molding pressure locally is different and depends on the locally differently strong molding or compression. In the rim area with a compression yp to e.g. 1 mm thickness the molding pressure is up to abt. 12 kp/cm$^2$, while in the medium area with a compression up to a total thickness of e.g. 10-15 mm it is abt. 2 kp/cm$^2$. The bonding of the plyethylene foam panels to the corrugated cardboard is established, in this procedure, simultaneously by the compressive pressure during the molding step in the heated condition. This process has the advantage that the composite can be provided with more pronounced protuberances and molded portions since the individual sheets can shift with respect to one another along the boundary layers during the molding step.

It is furthermore possible to utilize a combination of process steps, i.e. to mold sheets which have already been partially bonded together simultaneously with loose sheets.

The orientation of the corrugations of the corrugated cardboard used as the reinforcing layer is additionally of importance in the present invention. The arrangement of the corrugations can be in the longitudinal axis of the vehicle or also at right angles thereto; this arrangement depends quite essentially on the dimensions of the dome, the magnitude of the deformations provided by the molding step, and the required rigidity in conjunction with the intended mounting points of the dome to the automobile roof.

The dome according to this invention shows at the same time an improved noise attenuation as compared to the conventional hoop-frame domes.

The invention is illustrated in one embodiment in the drawings and will be explained in greater detail below with reference thereto.

Figure 1:
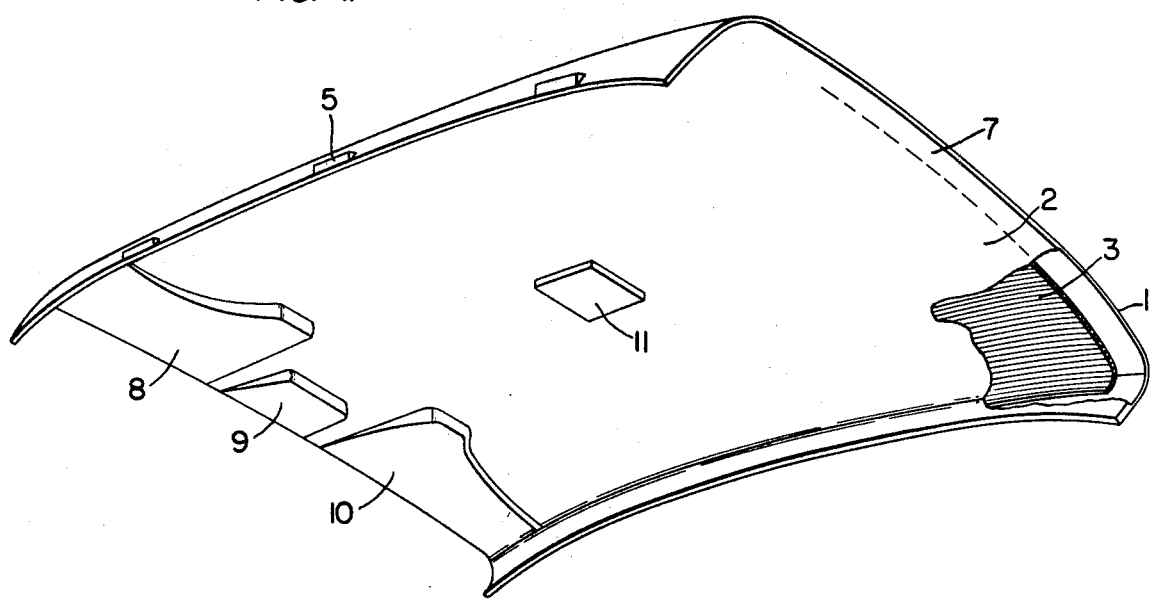
FIGS. 1 and 3 are perspective views of an automobile dome as seen from the visible surface, in two different embodiments.

As illustrated in FIG. 1, the finished, prefabricated self-supporting dome or headliner consists of crosslinked polyethylene foam panels 1 and 2 with a sheet of corrugated cardboard 3 incorporated therein by flame laminating. In this construction, the visible face of the foam panel 2 can additionally be provided with a decorative material, e.g. a textile material or synthetic leather, by lamination. The reinforcing sheet 3 of corrugated cardboard is smaller in its dimensions than the foam panels 1 and 2 so that a marginal strip is formed consisting of the polyethylene foam panels. Corrugated cardboard sheets are very sensitive to moisture and lose considerably in rigidity upon moisture absorption, which must absolutely be avoided. Since polyethylene foam material is water-impermeable due to its closed-cell structure, the penetration of moisture can be prevented by providing that the foam material completely encloses the corrugated cardboard sheet. This is accomplished, for example, by having the rim of the polyethylene foam panel project and form the marginal strip 7. During the heat treatment and the subsequent molding step, the projecting rims of the polyethylene foam panels are bonded together in an absolutely moistureproof manner. In addition to the molded portions 8, 9, 10, and 11, FIGS. 1 and 2 furthermore show nubs 5 additionally molded along the outside, which serve for attaching the dome within the automobile. Molding was effected at 160°-180° C. in a mold at a pressure of 2-12 kp/cm$^2$.

Figure 2:
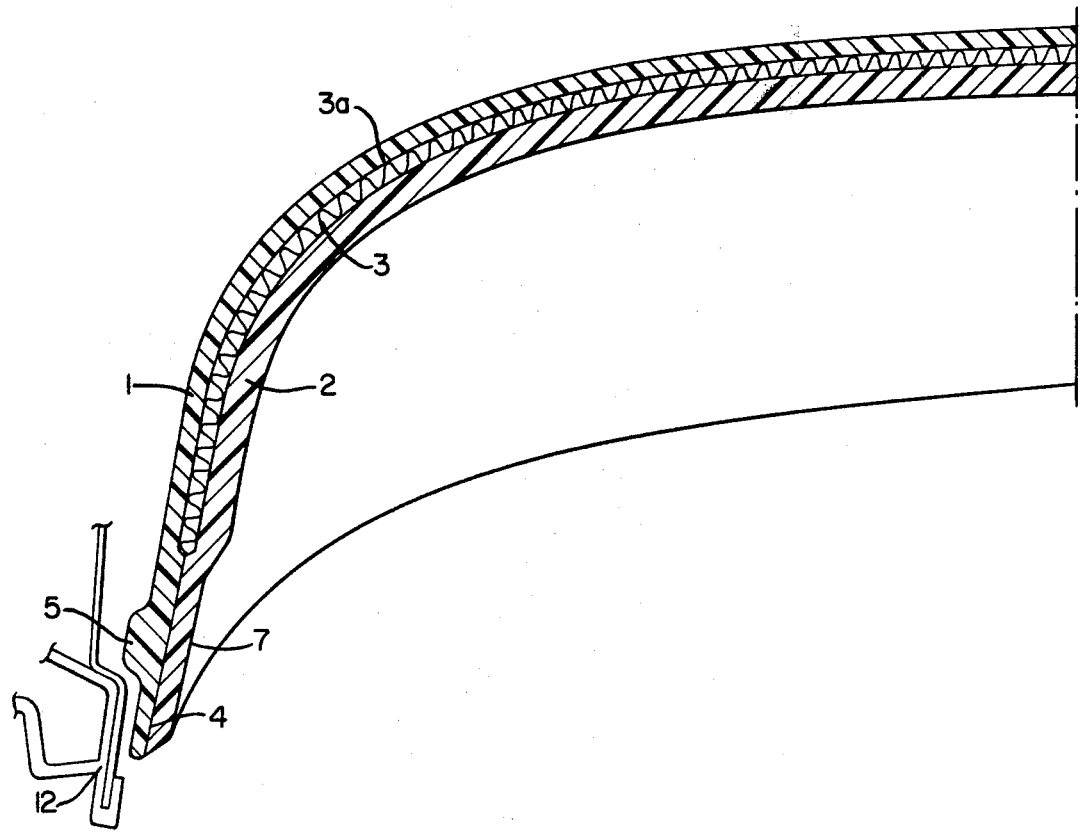
FIG. 2 shows a partial cross-sectional view of a dome according to FIG. 1.
Figure 3:
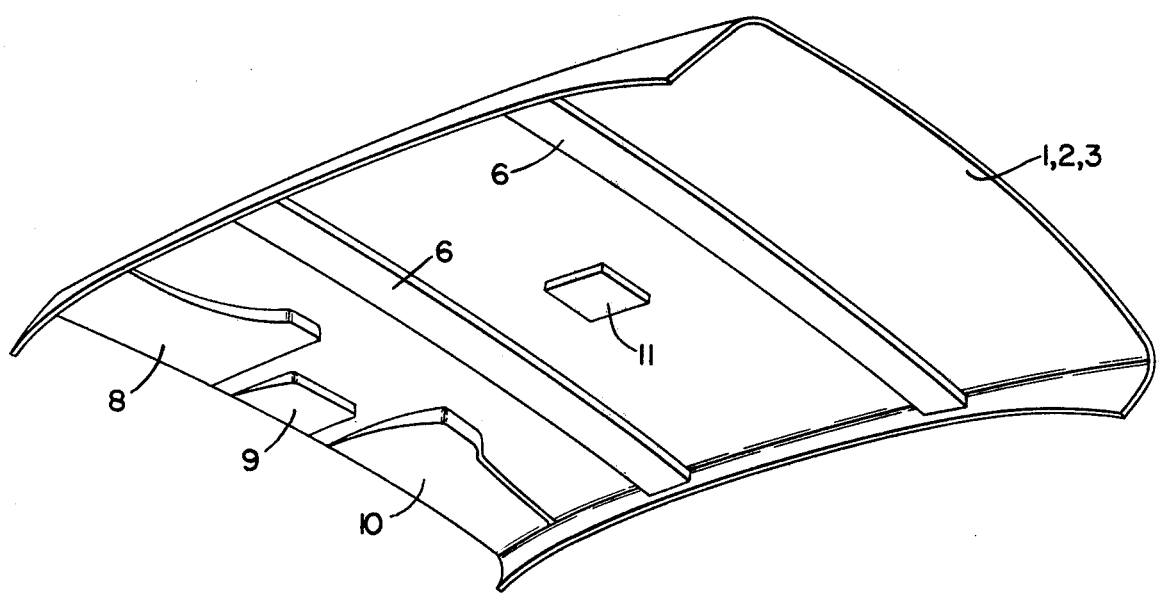
Figure 4:
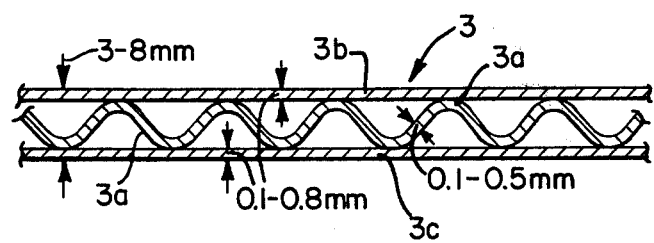
FIG. 4 is an enlarged partial cross-sectional view of corrugated cardboard reinforcing sheet.
Figure 5:
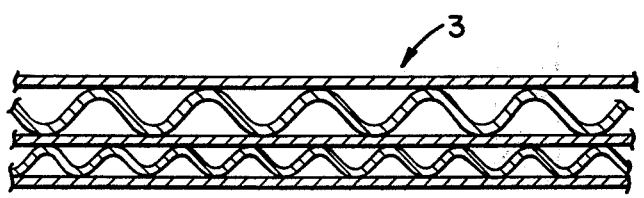
FIG. 5 is a corrugated cardboard with two layers of corrugations.

FIG. 3 shows essentially a dome as described in connection with FIGS. 1 and 2, except that coverings or raised portions 6 are additionally molded into the component for the roof reinforcing crossbeams normally present in an automobile.

The section according to FIG. 2 shows the wide marginal strip 7 of the polyethylene foam panels 1, 2; this strip is tightly and firmly joined by means of heat in the seam 4. The corrugations 3a of the corrugated cardboard sheet extend, in the illustrated examples, in the longitudinal direction of the vehicle roof and thus enhance the rigidity and facilitate the molding step. At the rim, the engagement of the dome into the support 12 at the vehicle roof 2 is illustrated.

It will be appreciated from the description of the dome or headliner of the present invention as well as the illustration provided in the accompanying drawings that the self-supporting molded dome or headliner is molded to have a contoured configuration whch corresponds entirely or approximately to the interior configuration or shape of the surface of the roof of the automobile in which the dome or headliner is to be utilized. Also, the self-supporting dome will usually have a thickness which in the molded and shaped condition may vary at the various points for inst. from about 2 to 20 mm, depending upon the mechanical requirements of a given application.

An exact adaption of the dome to the interior roof configuration, in general, is not necessary because the dome is self-supporting. Locally there may be even a gap between the dome and the automobile roof; but for considerably projecting roof elements, such as reinforcing crossbeams, it is recommendable to form corresponding recesses directly into the dome.

As reinforcing layer preferably corrugated cardboard, which can be a single or multi-layer, is used. Using multi-layer corrugated cardboard the individual corrugated layers separated from another, e.g. by intermediate layers of paper may have various corrugation dimensions. Simple smooth carton material made by pressing of paper mass in different layer thicknesses in contrary to corrugated cardboard has a homogeneous structure across its cross section. As at the same thickness simple smooth carton material is much less deformable than corrugated cardboard it only is used for such domes and deformations of which comparably are small. The reinforcing layer preferably is used in thicknesses of 3-8mm (measured before pressing).

The dome according to the invention can be made for inst. in the following operation steps:

(a) Laminating by heat or bonding a foam sheet from polyethylene with decorative material, such as for inst. from synthetic leather or textile;

(b) bilateral laminating by heat of the punched corrugated cardboard cuts with the polyethylene foam in which case the sheet with the decorative material according to (a) is applied to the side of the dome which is later directed to the interior room of the automobile;

(c) heating of the composite construction in a radiating system or a furnace with air circulation;

(d) shaping in a molding device with a cooled tool consisting of a male and female mold;

(e) punching of the dome, and, (f) in case, bordering of the rim.

What is claimed is:

1. A self-supporting molded component for lining the inside of automobile roofs, comprising a layered composite arrangement of crosslinked polyethylene foam panels laminated on both sides to at least one reinforcing layer of corrugated cardboard or carton material, said polyethylene foam panels being arranged so that the reinforcing layer is surrounded on all sides by the polyethylene foam panels and is sealed off against the penetration of mositure.

2. The molded component according to claim 1, wherein the foam panels have outer edges that are arranged to extend beyond the reinforcing layer, said outer edges being sealed together during the formation of said molded component.

3. The molded component according to claim 1, wherein projections of polyethylene foam are integrally molded thereto on the side that faces the automobile roof, in marginal zones, of said component.

4. The molded component according to claim 2, wherein the edges of the polyethylene foam panels are joined together and form a continuous marginal strip.

5. The molded component according to claim 1, wherein a visible surface which faces the interior of the automobile is provided with decorative materials.

6. A self-supporting molded component for lining the interior surface of a roof of an automobile which comprises a laminated composite of crosslinked polyethylene foam panels adhered to the upper and lower sides of a reinforcing layer consisting of at least one corrugated cardboard material, having a thickness of from 3 to 8 mm, said corrugated cardboard material comprising two outer layers of paperboard material having a thickness of from 0.1-0.8 mm and an intermediate corrugated layer of paperboard material having a thickness of from 0.1-0.5 mm and the polyethylene foam panels having outer edges extending beyond the outer edges of the reinforcing layer, said outer edges of the foam panels being sealed together to prevent the penetration of moisture into said reinforcing layer.

* * * * *